(12) United States Patent
Rapaport

(10) Patent No.: US 6,837,951 B2
(45) Date of Patent: Jan. 4, 2005

(54) METHOD OF THERMOFORMING A BLADDER STRUCTURE

(75) Inventor: Zvi Rapaport, Portland, OR (US)

(73) Assignee: Nike, Inc., Beaverton, OR (US)

( * ) Notice: Subject to any disclaimer, the term of this patent is extended or adjusted under 35 U.S.C. 154(b) by 101 days.

(21) Appl. No.: 09/995,003

(22) Filed: Nov. 26, 2001

(65) Prior Publication Data

US 2003/0098118 A1 May 29, 2003

(51) Int. Cl.[7] .............................................. B32B 31/04
(52) U.S. Cl. .................... 156/145; 156/196; 156/308.4; 36/29; 428/69
(58) Field of Search .............................. 156/145, 196, 156/308.4; 428/69; 36/28, 29

(56) References Cited

U.S. PATENT DOCUMENTS

| | | | |
|---|---|---|---|
| 4,025,974 A | * | 5/1977 | Lea et al. ....................... 5/709 |
| 4,287,250 A | | 9/1981 | Rudy |
| 4,906,502 A | | 3/1990 | Rudy |
| 5,083,361 A | | 1/1992 | Rudy |
| 5,572,804 A | | 11/1996 | Skaja et al. |
| 5,976,451 A | | 11/1999 | Skaja et al. |
| 5,993,585 A | | 11/1999 | Goodwin et al. |
| 6,029,962 A | | 2/2000 | Shorten et al. |
| 6,098,313 A | | 8/2000 | Skaja |
| 6,119,371 A | | 9/2000 | Goodwin et al. |

* cited by examiner

Primary Examiner—Blaine Copenheaver
Assistant Examiner—Barbara J. Musser
(74) Attorney, Agent, or Firm—Banner & Witcoff, Ltd.

(57) ABSTRACT

A method for thermoforming a resilient, fluid-filled bladder structure with thermal contact molding is disclosed. The bladder includes two sheets of thermoplastic material that are separated by at least one core formed of two spaced outer layers connected together by a plurality of connecting members. The bladder is formed by bonding the sheets to the core, bonding the sheets to each other around the periphery of the core and forming a sidewall between the sheets in a single mold. A fluid is then inserted into the space bounded by the peripheral bond and the two sheets such that the connecting members are extended.

35 Claims, 9 Drawing Sheets

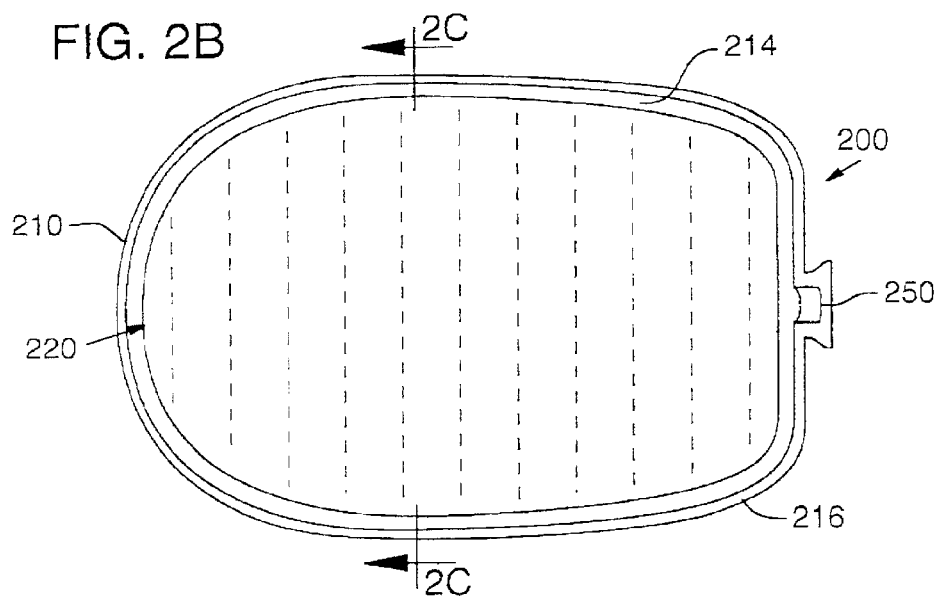
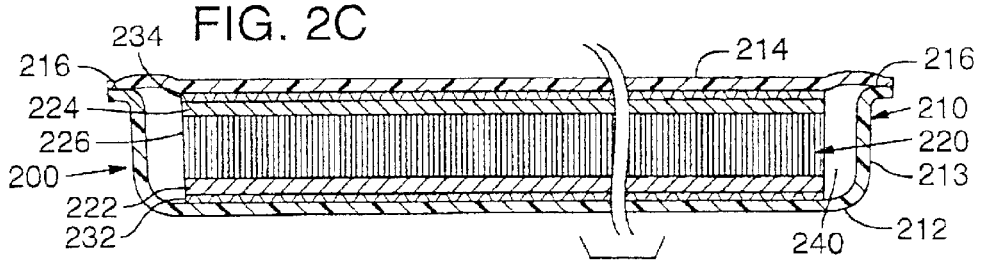

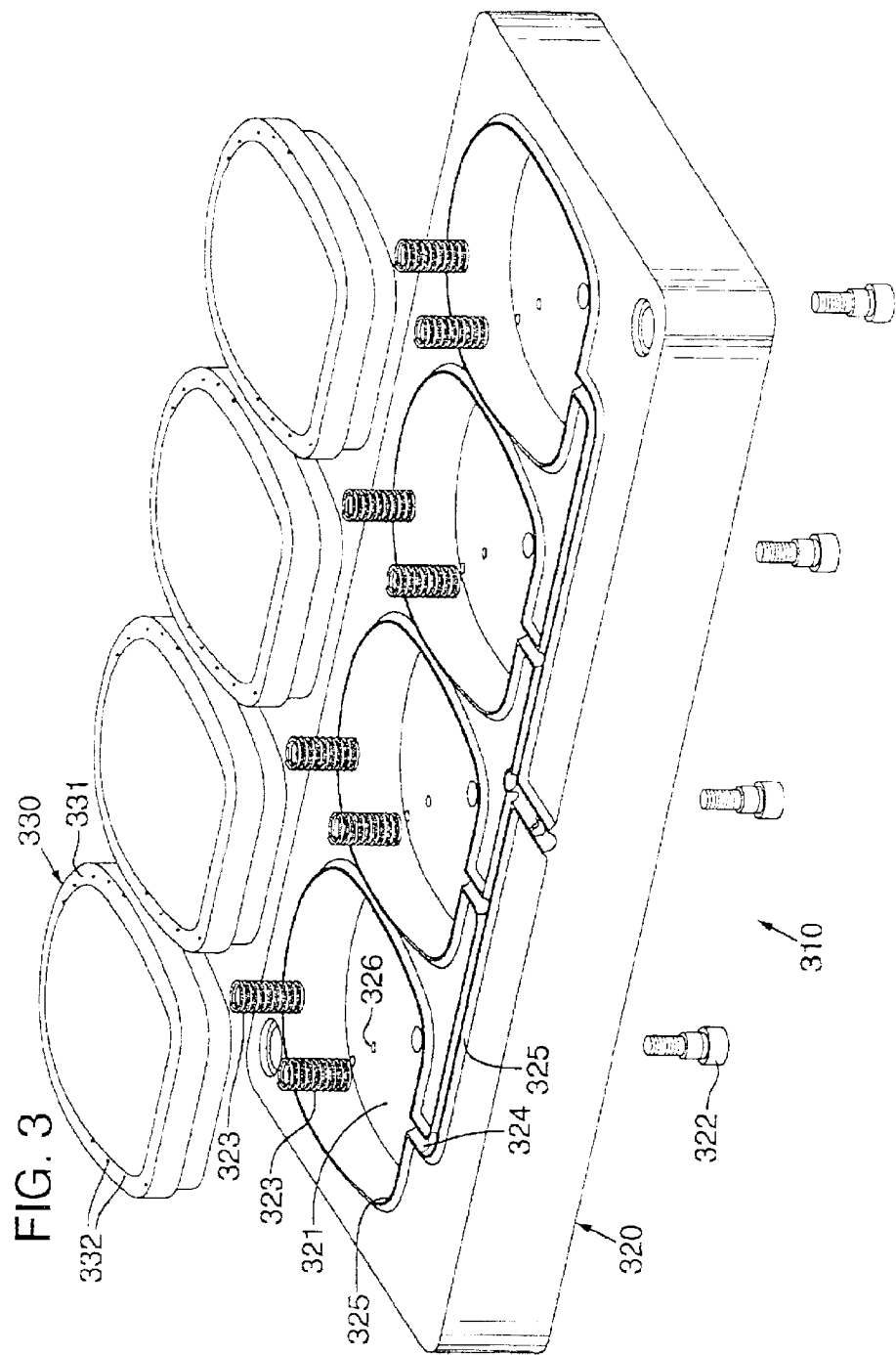

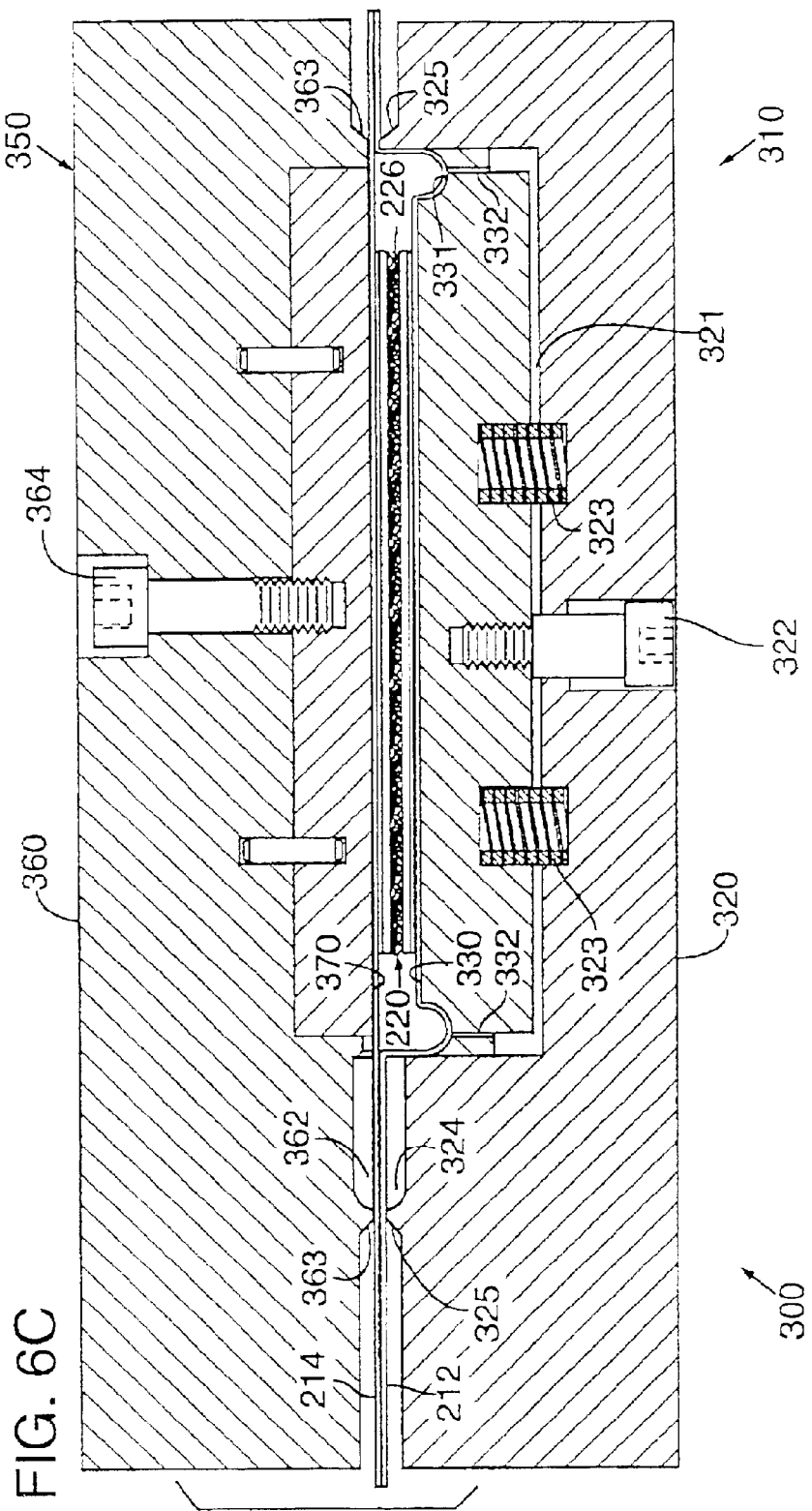

METHOD OF THERMOFORMING A BLADDER STRUCTURE

BACKGROUND OF THE INVENTION

1. Field of the Invention

The present invention relates to a method for thermoforming a resilient, fluid-filled bladder for use in a variety of applications, including footwear soles.

2. Description of Background Art

Footwear is divided into two general parts, an upper and a sole. The upper is designed to comfortably enclose the foot and the sole provides traction, protection, and a durable wear surface. The considerable forces generated in athletics require that the sole of footwear provide enhanced protection and shock absorption for the foot and leg. Accordingly, the sole of athletic footwear typically includes several layers, including a resilient, shock-absorbent midsole and a ground-contacting outsole which provides both durability and traction.

Such midsoles have been formed of conventional foam materials, for example, ethylene vinyl acetate or polyurethane which compress resiliently under an applied load and provide cushioning. Outsoles have been made of conventional wear-resistant materials such as a carbon-black rubber compound. Conventional foam materials are resiliently compressible, in part, due to the inclusion in the foam of open or closed cells defining an inner volume that is substantially displaced by gas. That is, the foam can include bubbles formed in the material which include air therein. However, after repeated compressions, the cell structure collapses, resulting in decreased compressibility of the foam. Thus, the overall cushioning of the midsole deteriorates.

One way to overcome the drawbacks of using conventional foam materials is disclosed in U.S. Pat. No. 4,183,156 to Marion F. Rudy, hereby incorporated by reference, in which cushioning is provided by inflatable inserts made of elastomeric materials. The inserts include a plurality of tubular chambers which extend substantially longitudinally throughout the length of the footwear. The chambers are in fluid communication with each other and jointly extend across the width of the footwear. In U.S. Pat. No. 4,219,945 to Marion F. Rudy, hereby incorporated by reference, an inflated insert is encapsulated in a foam material. The combination of the insert and the encapsulating material functions as the midsole. An upper is cemented to the upper surface of the encapsulating material and an outsole or tread member may be fixed to the lower surface.

U.S. Pat. No. 4,817,304 to Mark G. Parker, et al., hereby incorporated by reference, discloses a foam-encapsulated, gas-filled insert in which gaps are left along the sides of the encapsulating member. When the midsole is compressed, the insert expands into the gaps. Thus, the gaps provide decreased stiffness in compression of the midsole, while reducing the overall weight of the footwear. Further, by appropriately locating the gaps, the overall impact response characteristics can be tuned along areas of the footwear.

Such bladders generally are made of an elastomeric material and are formed so as to have an upper or lower surface enclosing one or more chambers therebetween. The chambers are pressurized above ambient pressure by insertion of a nozzle or needle connected to a fluid pressure source into a fill inlet formed in the bladder. After the chambers are pressurized, the fill inlet is sealed, for example, by welding, and the nozzle is removed.

Bladders of this type have been manufactured by the prior art two-film technique in which two separate sheets of elastomeric film are formed having the overall peripheral shape of the bladder. The sheets are welded together along the periphery to form a bladder having upper, lower, and side surfaces, and at predetermined interior areas to give the bladder a desired configuration; that is, to have chambers of a predetermined shape and size at desired locations.

Bladders have also been manufactured by the prior art blow-molding technique, wherein a liquefied elastomeric material is placed in a mold having the desired overall shape and configuration of the bladder. The mold has an opening at one location through which pressurized air is provided. The pressurized air forces the liquefied elastomeric material against the inner surfaces of the mold and causes the material to harden in the mold to form a bladder having the desired shape and configuration.

Another type of prior art bladder used in soles of footwear is disclosed in U.S. Pat. Nos. 4,906,502 and 5,083,361, both to Marion F. Rudy, and both hereby incorporated by reference. The bladders disclosed in the '502 and '361 patents are formed as a gas pressurized and inflated structure which comprises an hermetically sealed outer covering barrier layer which is securely bonded substantially over the entire outer surfaces of a double-walled fabric core. The double-walled fabric core is comprised of first and second outer fabric layers which are normally spaced apart from one another at a predetermined distance. Connecting or drop yarns, potentially in the form of multi-filament yarns comprised of many individual fibers, extend internally between the proximal or facing surfaces of the respective fabric layers. The filaments of the drop yarns form tensile restraining means and are anchored to the respective fabric layers. A suitable method of manufacturing the double walled fabric structure is double needle bar Raschel knitting.

U.S. Pat. Nos. 5,993,585 and 6,119,371, both issued to David A. Goodwin et al., and both hereby incorporated by reference, disclose a bladder utilizing a double-walled fabric core, as with the '502 and '361 patents, but without a peripheral seam located midway between the upper and lower surfaces of the bladder. Instead, the seam is located adjacent to the upper surface of the bladder. Advantages in this design include removal of the seam from the area of maximum sidewall flexing and increased visibility of the interior of the bladder, including the connecting yarns. The process used to form a bladder of this type, according to the '585 patent, involves the formation of a shell, which includes a lower surface and a sidewall, with a mold. A double-walled fabric core is placed on top of a covering sheet, and the shell, following removal from the mold, is placed over the covering sheet and core. The assembled shell, covering sheet, and core are then moved to a lamination station where radio frequency energy bonds opposite sides of the core to the shell and covering sheet and bonds a periphery of the shell to the covering sheet. The bladder is then pressurized by inserting a fluid so as to place the connecting yarns in tension.

A process for thermoforming a bladder is disclosed in U.S. Pat. No. 5,976,451 to Joseph J. Skaja et al., hereby incorporated by reference, wherein a pair of flexible thermoplastic resin sheets are heated and placed against a pair of molds, a vacuum drawing the sheets into the mold. The sheets are then pressed together to form a bladder.

BRIEF SUMMARY OF THE INVENTION

The present invention is directed to a method for forming a resilient, fluid-filled bladder structure. The method includes the step of placing at least one core between a first and second sheet of thermoplastic material, the core having first and second outer layers that are spaced apart and connected together by a plurality of connecting members. The core and sheets are heated and placed into a mold. The mold closes upon the core and sheets such that a first portion of the mold contacts the first sheet in the area of the first outer layer, thereby bonding the first sheet to the first outer layer and forming a sidewall around the periphery of the core; a second portion of the mold contacts the second sheet in the area of the second outer layer, thereby bonding the second sheet to the second outer layer; and portions of the first sheet and the second sheet are compressed together around substantially the entire periphery of the core, thereby forming a peripheral bond between the sidewall of the first sheet and the second sheet. Finally, a fluid is inserted into the space bounded by the peripheral bond, the first sheet, and the second sheet such that the connecting members are placed under tension.

The bladder formed by the method of the present invention includes an outer enclosing member and an inner core. The outer enclosing member is formed of two sheets of a thermoplastic material that are joined to form a peripheral bond. Located within the outer enclosing member is the core. The core is formed of two fabric layers that are connected by a plurality of connecting members, such as drop yarns. The fabric layers are bonded to the outer enclosing member. A pressurized fluid is also located within the outer enclosing member, thereby placing the connecting members under tension.

Unlike the prior art thermoforming technique of the '451 patent to Skaja et al., the present method has the advantage of locating the seam that joins the two sheets of thermoplastic material in a position that is not centrally located in the bladder sidewall, thereby removing the seam from the area of maximum sidewall flexing and increasing visibility of the bladder's interior. Furthermore, the present method achieves this result using a more efficient manufacturing process than that of the '585 patent. Improved efficiency is achieved by minimizing the required tooling set, i.e., no laminating set or RF tooling set is necessary; lowering labor and cycle times; and permitting more bladders to be formed per unit of material. The present process also improves bladder quality in that lamination welds and bladder dimensions are more consistent.

The manufacturing process is generally comprised of a preliminary stage, heating stage, bonding stage, and inflation stage. During the preliminary stage, a core, as described above, is temporarily attached to a sheet of thermoplastic material and a second sheet of thermoplastic material is placed over the core, thereby locating the core between the two sheets. An inflation needle and a spacer are also placed between the sheets and the materials are secured in place using clamps on a shuttle frame. The heating stage includes heating the components in an oven for a predetermined period of time. The oven softens the thermoplastic sheets such that bonding may occur in future steps.

The components are immediately positioned in a mold and the bonding stage is initiated. The mold includes of two opposing portions that compress the components, thereby bonding the core to the sheets and the sheets to each other through the process of time-dependent, thermal contact welding. As the mold begins to close, inserts in the lower mold portion of the mold contact one of the thermoplastic sheets. An insert in the upper mold portion of the mold then contacts the other thermoplastic sheet and the core is compressed between the inserts such that bonding occurs between the outer layers of the core and the sheets. As the mold continues to close, the two thermoplastic sheets are bonded around the periphery of the core and an inflation conduit is formed that connects the inflation needle with the core area. A partial vacuum may be applied to the outer surfaces of the sheets and a gas may be injected into the core area to facilitate drawing the sheets against the surfaces of the mold. Once bonding is complete, the mold is opened and the components are removed and permitted to cool.

As a final stage, the core area is pressurized with a fluid through the inflation conduit and the inflation conduit is sealed adjacent to the core area. Following inflation, the internal pressure of the bladder may be such that the connecting members are placed under tension. Finally, excess material is removed from the perimeter of the bladder, thereby completing manufacturing process of a bladder that is suitable for incorporation into a broad range of footwear.

The various advantages and features of novelty that characterize the present invention are pointed out with particularity in the appended claims. To gain an improved understanding of the advantages and features of novelty that characterize the present invention, however, reference should be made to the descriptive matter and accompanying drawings which describe and illustrate various embodiments of the invention.

BRIEF DESCRIPTION OF THE DRAWINGS

FIG. 2B is a top plan view of the bladder in FIG. 2A.

FIG. 2C is a cross-sectional view along line 2C—2C in FIG. 2B.

FIG. 3 is a perspective exploded view of a lower mold portion in accordance with the present invention

FIG. 6C is a third cross-sectional view along line 6—6 in FIG. 5 with compressed bladder components located between the upper mold portion and the lower mold portion.

DETAILED DESCRIPTION OF THE INVENTION

Figure 1:
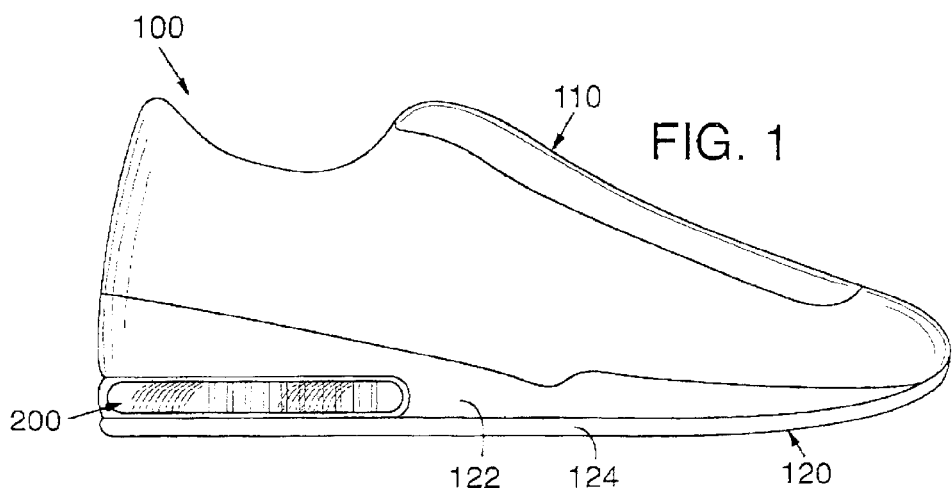
FIG. 1 is an elevational view of an article of footwear incorporating a bladder formed in accordance with a method of the present invention.

Article of footwear 100, depicted in FIG. 1, includes an upper 110 and a sole structure 120. Upper 110 is configured to receive a foot of a wearer. Sole structure 120, which provides a durable, shock-absorbing medium located between the foot and the ground, is primarily formed of a midsole 122 and an outsole 124. A bladder 200, formed in accordance with the method disclosed below, is secured in the heel area of midsole 122 and above outsole 124. As depicted in FIG. 1, article of footwear 100 is an athletic shoe. Bladder 200 may, however, be utilized in other types of footwear, including dress shoes, sandals, in-line skates, and boots.

Figure 2A:
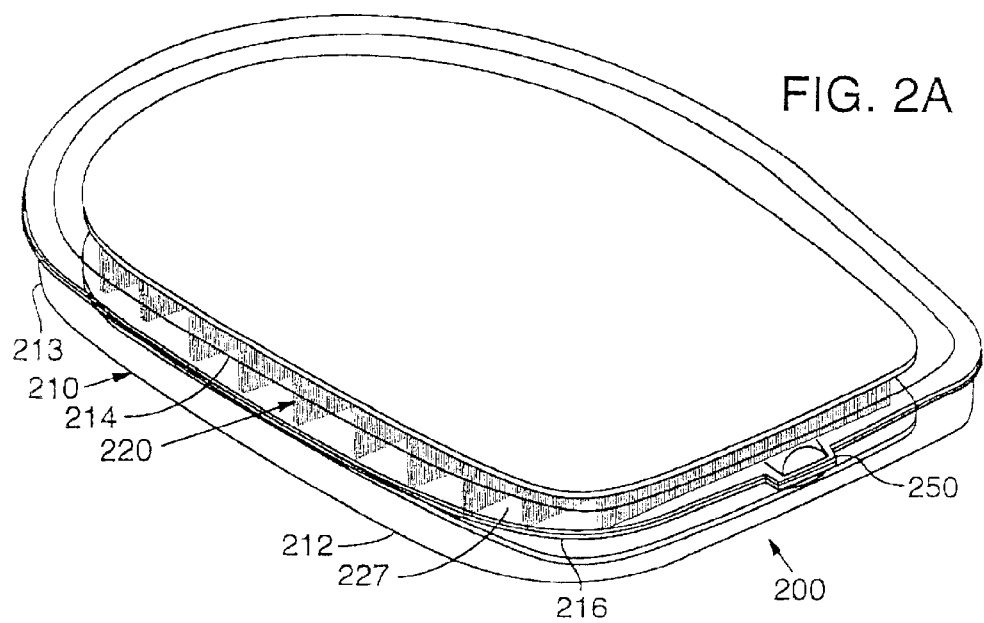
FIG. 2A is a perspective view of a bladder formed in accordance with a method of the present invention.

Bladder 200, depicted in FIG. 2, includes an outer enclosing member 210, an inner core 220, a pair of coupling layers 232 and 234, a fluid 240, and an inlet 250. Outer enclosing member 210 is formed of a first sheet 212 and a second sheet 214 that are joined to form a peripheral bond 216. The material forming sheets 212 and 214 may be, for example, five alternating layers of thermoplastic polyurethane and ethylene-vinyl alcohol copolymer, as disclosed in U.S. Pat. No. 5,713,141 to Mitchell et al, incorporated by reference. A variation upon this material wherein the center layer is formed of ethylene-vinyl alcohol copolymer; the two layers adjacent to the center layer are formed of thermoplastic polyurethane; and the outer layers are formed of a regrind material of thermoplastic polyurethane and ethylene-vinyl alcohol copolymer may also be utilized for sheets 212 and 214. Another suitable material is a flexible microlayer membrane that includes alternating layers of a gas barrier material and an elastomeric material, as disclosed in U.S. Pat. Nos. 6,082,025 and 6,127,026 to Bonk et al., incorporated by reference. A suitable thickness range for first sheet 212 is 30 to 60 mils, with one preferred thickness being 50 mils, and a suitable thickness range for second sheet 214 is 20 to 45 mils, with one preferred thickness being 30 mils. Other suitable materials for sheets 212 and 214 include those noted in the above Rudy patents, which have been incorporated herein by reference. As illustrated in FIG. 2, first sheet 212 and second sheet 214 are integrally formed around core 220 by a method in accordance with the present invention, described in detail below. The material forming first sheet 212 may be configured such that core 220 is visible through sidewall 213. First sheet 212 may, therefore, be transparent, translucent, clear, or colored, to facilitate the visibility of core 220.

Core 220 may be formed of a double-walled fabric member that includes a first outer layer 222 and a second outer layer 224 which are normally spaced apart from one another at a predetermined distance. Although core thickness may vary, a thickness range suitable for footwear applications may range from 8 to 15 millimeters, one suitable thickness being approximately 14.5 to 15 millimeters. A plurality of connecting members 226, comprised of drop yarns that include multiple filaments, extend between outer layers 222 and 224. The drop yarn filaments form tensile restraining members and are anchored to outer layers 222 and 224. One method of manufacturing core 220 is double needle bar Raschel knitting. Outer layers 222 and 224 may be formed of air-bulked or otherwise texturized yarn, such as false twist texturized yarn, particularly a combination of Nylon 6, 6 and Nylon 6. Connecting members 226 may be formed of a similar material.

The plurality of yarns comprising connecting members 226 may be arranged in bands that are separated by gaps 227. The use of gaps 227 provides core 220 with increased compressibility in comparison to cores formed of double-walled fabrics that utilize continuous connecting yarns. Connecting members 226 and gaps 227 also have the potential to provide an appealing appearance when viewed through sidewall 213. Gaps 227 are formed during the double needle bar Raschel knitting process by omitting connecting yarns on certain predetermined needles in the warp (wale) direction. Knitting with three needles in and three needles out produces a suitable fabric with connecting members 226 being separated by gaps 227. Other knitting patterns of needles in and needles out can be used, such as two in and two out, four in and two out, two in and four out, or any combination thereof. Also, gaps may be formed in both a longitudinal and transverse direction by omitting needles in the warp direction or selectively knitting or not knitting on consecutive courses.

In order to facilitate the bonding of first outer layer 222 to first sheet 212, first coupling layer 232 may be disposed therebetween. Similarly, second coupling layer 234 may be disposed between second outer layer 224 and second sheet 214. Coupling layers 232 and 234, which may be formed of the same thermoplastic material as sheets 212 and 214, are applied to outer layers 222 and 224 such that coupling layers 232 and 234 penetrate a portion of each coupling layer 232 and 234 without adhering to connecting members 226. The application of coupling layers 232 and 234 to outer layers 222 and 224 may be achieved by compressing the materials at 5 psi between upper and lower heated platens of a 250 degree Fahrenheit press for approximately 5 seconds. This method and other suitable methods of applying the coupling material to the fabric layers are discussed in detail in the '361 Rudy patent.

Bladder 200 contains a fluid 240 such as nitrogen. Other suitable gasses include hexafluorethane (e.g., Freon, F-116), sulphurhexafluoride, air, and the gasses discussed in the aforementioned Rudy patents, in particular the '156 patent.

The overall manufacturing process for bladder 200 generally includes the steps of preparation, heating, bonding, and inflation. A shuttle mechanism, or other transfer mechanism, may be used to transport the components of bladder 200 between the various steps of the manufacturing process. The shuttle mechanism may include a shuttle frame, various clamps that secure bladder components to the shuttle frame, and a spacer that prevents sheets 212 and 214 from prematurely contacting during the heating step. In an alternate embodiment, the spacer may be replaced by a fluid layer having a pressure of 2 to 5 psi that prevents contact. In general, the components of bladder 200 are organized, assembled, and secured to the shuttle frame during the preparation steps. Once prepared, the bladder components are transported into an oven where they are heated for a predetermined time so as to reach a desired temperature. The shuttle mechanism then transports the components to a mold 300 where sheets 212 and 214 are securely bonded to core 220. Sheets 212 and 214 are then bonded to each other to form peripheral bond 216 at an elevation that approximately corresponds with the elevation of second sheet 214. Following bonding, the components are removed from the shuttle frame, permitted to cool, and inflated to a desired pressure.

A portion of the preparation steps and the bonding steps may both occur in the area of mold 300. As such, bladder components may be arranged and secured to the shuttle frame in the area of mold 300 and then transported to the oven for heating. Following heating, the materials exit the oven and return to the area of mold 300 for purposes of bonding. The advantage of this configuration is that a single individual may oversee preparation, heating, and bonding. Furthermore, when bonding is complete, the shuttle frame is correctly positioned for a subsequent cycle, thereby increasing process efficiency. Specifics regarding the manufacturing method of the present invention are detailed in the following material.

The manufacturing process is initiated by pre-tacking core 220 to first sheet 212. This may be achieved by positioning core 220 on first sheet 212 and compressing core 220 and first sheet 212 between platens of a heated press such that first sheet 212 bonds with first coupling layer 232. Pre-tacking ensures that core 220 is properly positioned on first sheet 212 for the molding process, as detailed below. Note that coupling layer 234 was previously applied to outer layer 224, as described above, but not pre-tacked to second sheet 214.

When pre-tacking is complete, first sheet 212, core 220, and second sheet 214 are positioned in the shuttle frame such that core 220 is located between sheets 212 and 214. In order to prevent contact between sheets 212 and 214, the spacer is located between sheets 212 and 214. An inflation needle may also be positioned between sheets 212 and 214. Clamps located on the shuttle frame may be closed in order to ensure secure positioning of sheets 212 and 214, core 220, and the inflation needle.

The shuttle frame then transports the components of bladder 200 into the oven which can be any conventional oven capable of heating the thermoplastic material to an appropriate temperature for thermoforming. A typical oven may include a quartz-type radiant heater evenly raises the temperature of sheets 212 and 214. For reasons which will become apparent below, the thickness of first sheet 212 may be greater than that of second sheet 214. To ensure equal heating, the relative output of the heating elements that correspond with first sheet 212 and those that correspond with second sheet 214 may be adjusted accordingly.

The temperature to which sheets 212 and 214 are heated depends upon the specific material used. The material should be heated to a degree that exceeds the softening temperature, but is below the melting point, to ensure proper bonding. As noted above, sheets 212 and 214 may be formed from a variety of materials. A first suitable material includes alternating layers of thermoplastic polyurethane and ethylene-vinyl alcohol copolymer, which has a melting temperature between 350 and 360 degrees Fahrenheit. The temperature to which the first material should be heated is, therefore, between 300 and 320 degrees Fahrenheit. A second suitable material is formed of a flexible microlayer membrane that includes alternating layers of a gas barrier material and an elastomeric material, such as thermoplastic polyurethane, which also has a melting temperature in the range of 350 to 360 degrees Fahrenheit. A suitable temperature to which the second material may be heated is, however, between 320 and 335 degrees Fahrenheit. Following heating, the shuttle frame transports the components out of the oven and positions the components between a lower mold portion 310 and an upper mold portion 350 of mold 300.

Figure 4:
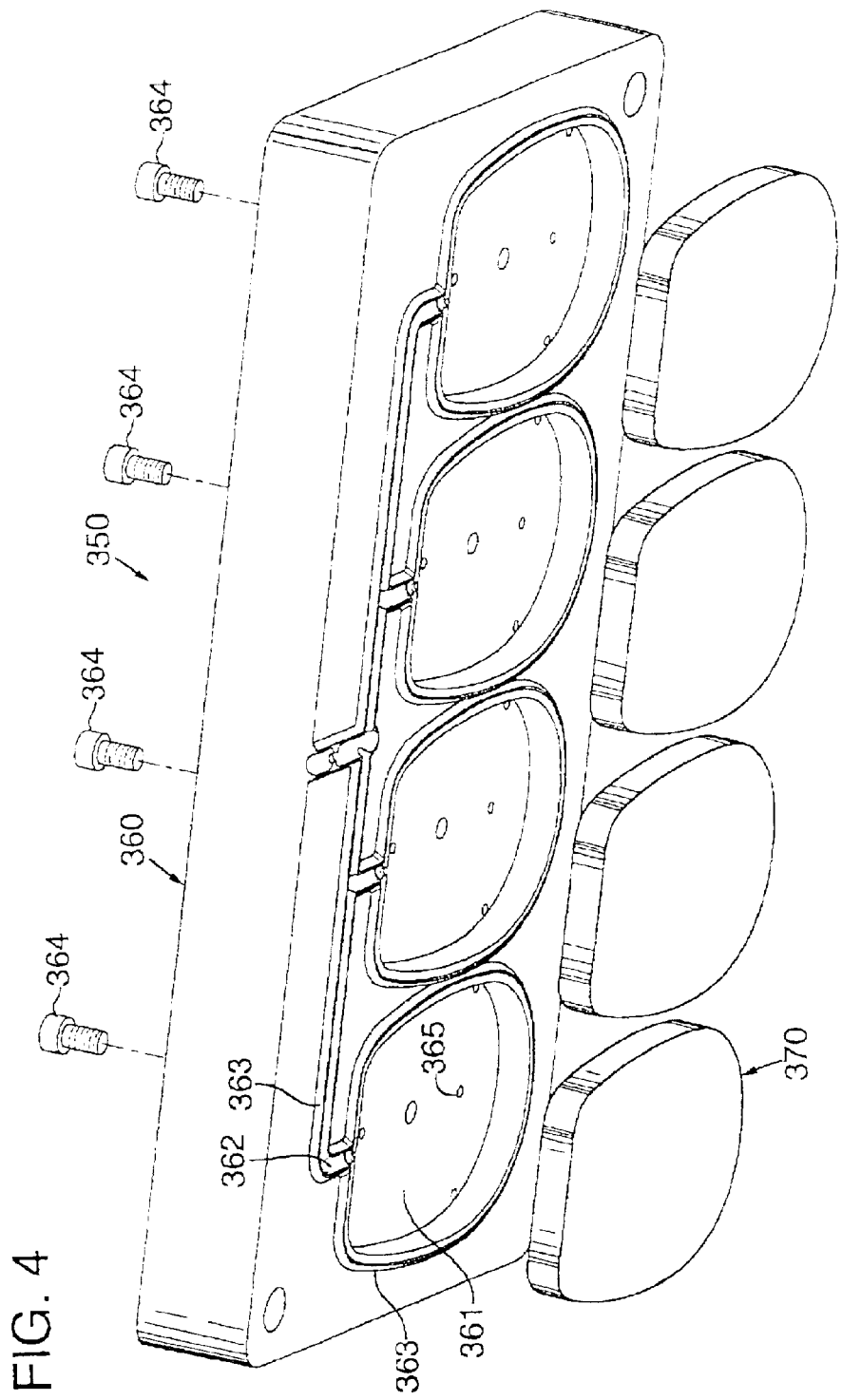
FIG. 4 is a perspective exploded view of an upper mold portion in accordance with the present invention.
Figure 5:
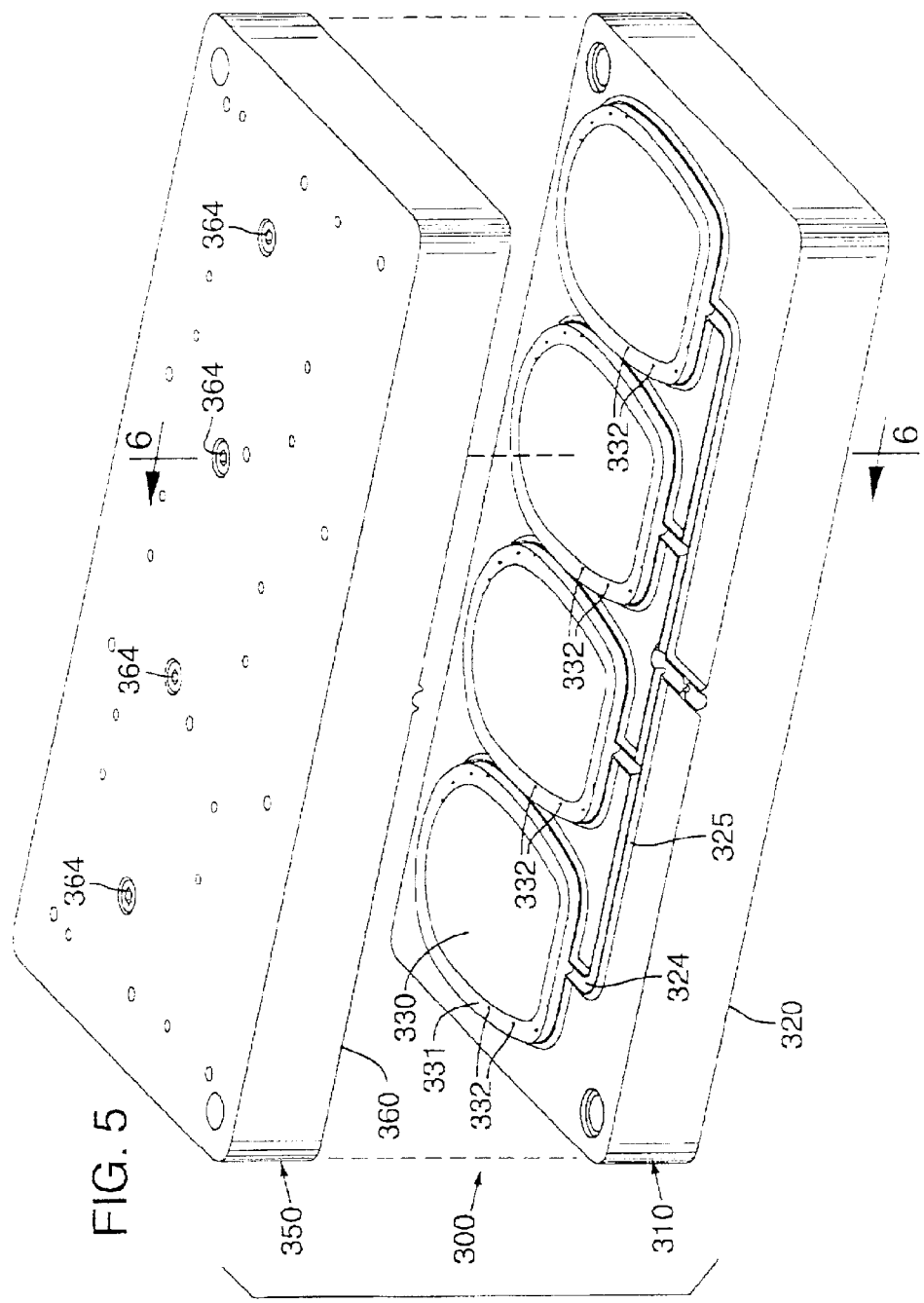
FIG. 5 is a perspective view of the lower mold portion aligned with the upper mold portion.

FIGS. 3 through 5 depict mold 300 as having a configuration wherein four bladders 200 may be simultaneously manufactured. The present manufacturing process may be utilized to simultaneously manufacture any number of bladders 200 and is not limited to the number depicted. Lower mold portion 310, depicted individually in FIG. 3 and with upper mold portion 350 in FIGS. 5 and 6, includes a lower plate 320 and a lower insert 330. A cavity 321 is formed in the upper surface of lower plate 320 and is properly dimensioned to receive lower insert 330. The lower surface of cavity 321 includes one or more vacuum ports 326. In addition to cavity 321, the upper surface of lower plate 321 includes a shallow, semi-circular channel 324 that extends from cavity 321 and a raised ridge 325 that extends along both sides of channel 324 and around cavity 321.

Lower insert 330 is secured within cavity 321 by shoulder screw 322 and rests upon two die springs 323 such that a portion of lower insert 330 remains positioned above the upper surface of lower plate 320 when no downward forces are applied. When a downward force is applied, however, die springs 323 compress and lower insert 330 retreats into cavity 321. The upper surface of lower insert 330 includes a perimeter indentation 331 that circumscribes the edge of lower insert 330. A series of apertures 332 are formed in perimeter indentation 331 that extend downward and through lower insert 330, thereby placing perimeter indentation 331 in fluid communication with cavity 321. As will be described below, perimeter indentation 331 is primarily responsible for forming sidewall 213. Accordingly, characteristics of perimeter indentation 331, including the length of the arc that forms the surface of perimeter indentation 331, should be selected to provide a sidewall height that locates peripheral bond 216 substantially on the plane of second sheet 214.

Upper mold portion 350, depicted individually in FIG. 4 and with lower mold portion 310 in FIGS. 5 and 6, is designed to correspond with the various elements of lower mold portion 310. Upper mold portion 350 includes an upper plate 360 and an upper insert 370. Upper plate 360 includes a cavity 361, a channel 362 that corresponds with channel 324 of lower plate 310, and a ridge 363 that lies adjacent to cavity 361 and channel 362. Upper insert 370 is secured within cavity 361 with a screw 364 such that the lower surface of upper insert 370 coincides with ridge 363. Note that upper insert 370 is stationary with respect to upper plate 360. Like lower plate 320, upper plate 360 includes vacuum ports 365.

When mold 300 is closed, corresponding portions of lower mold portion 310 and upper mold portion 350 are located adjacent to each other. For example, lower insert 330 and upper insert 370 will be located such that portions of lower insert 330 are located directly underneath corresponding portions of upper insert 370. Likewise, ridges 325 and 363 will be located such that a cylindrical space, formed by channels 324 and 362, is located between plates 320 and 360.

Figure 6A:
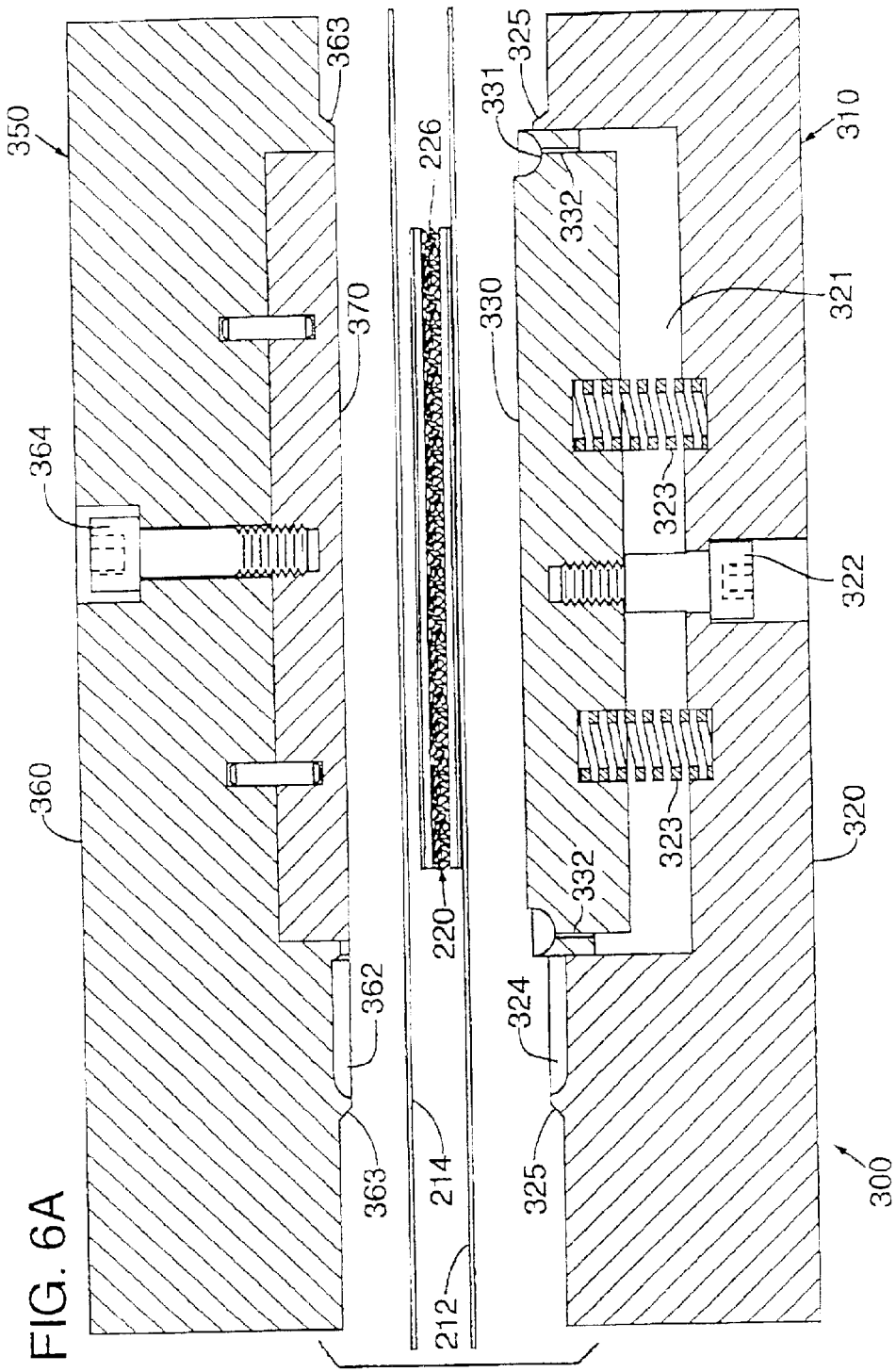
FIG. 6A is a first cross-sectional view along line 6—6 in FIG. 5 with uncompressed bladder components located between the upper mold portion and the lower mold portion.
Figure 6B:
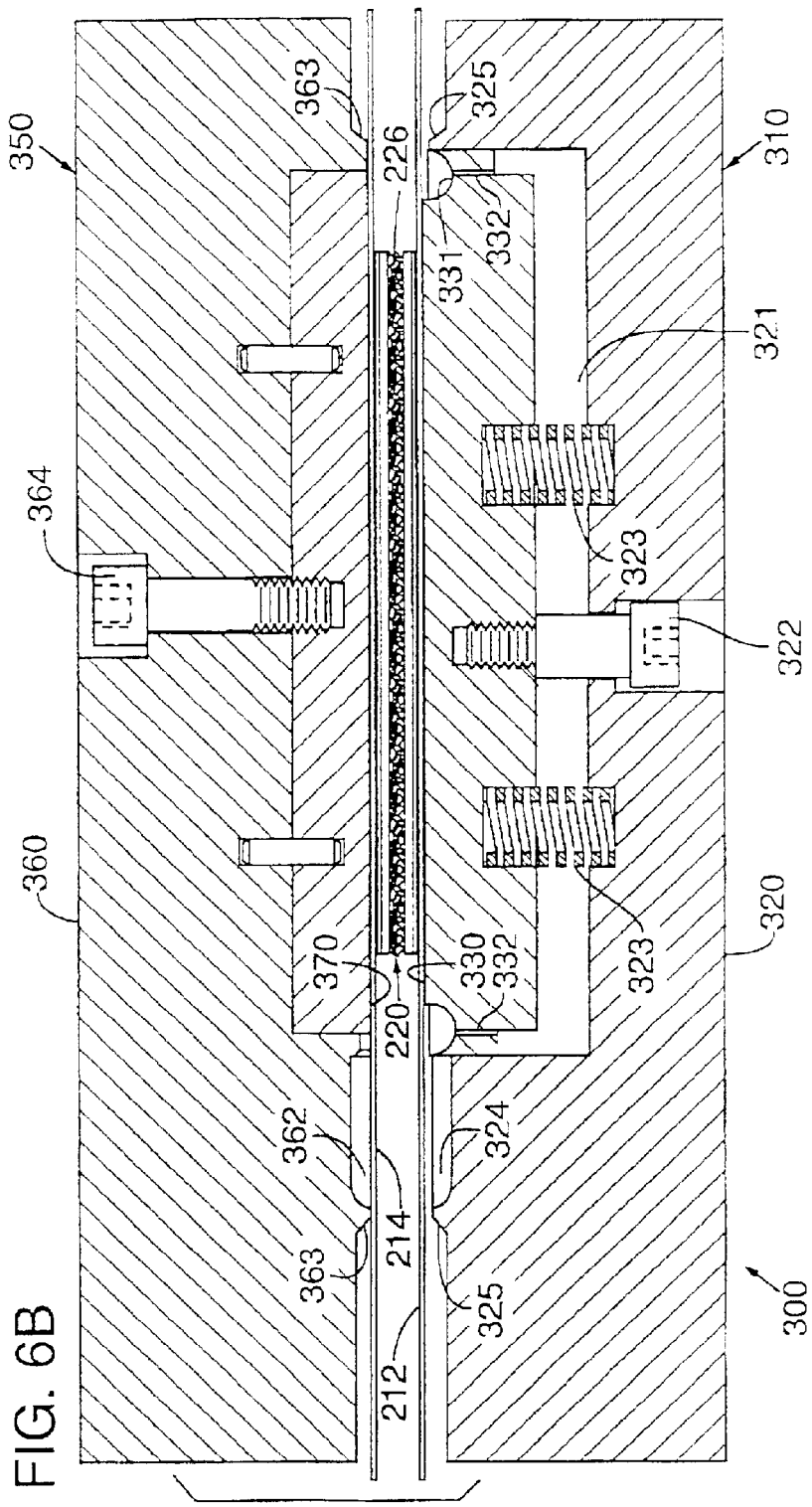
FIG. 6B is a second cross-sectional view along line 6—6 in FIG. 5 with partially compressed bladder components located between the upper mold portion and the lower mold portion.

If a shuttle frame is used, the shuttle frame properly positions the first sheet 212, second sheet 214, core 220, and coupling layers 230 between portions of mold 300, as depicted in FIG. 6A. Note that connecting members 226, in FIG. 6A, are depicted in a non-extended state. Lower mold portion 310 and upper mold portion 350 begin to close upon the components such that lower insert 330 contacts first sheet 212 in the area where first outer layer 222 is pre-tacked to first sheet 212 and upper insert 370 contacts second sheet 214 in the area of second outer layer 224, thereby compressing the components between inserts 330 and 370, as depicted in FIG. 6B. The compressive force of inserts 330 and 370, coupled with the elevated temperature of the compressed components, permanently bonds coupling layers 232 and 234 to sheets 212 and 214, respectively. In this manner, core 220 is effectively bonded to sheets 212 and 214.

Following bonding of the core, a vacuum in the range of 28 to 29.5 inches of mercury, for example, may be formed in perimeter indentation 331 and around the perimeters of inserts 330 and 370 by evacuating air through vacuum ports 326 and 365. As noted, perimeter indentation 331 includes apertures 332. When cavity 321 is evacuated by drawing air through vacuum port 326, air located within perimeter indentation 331 passes through apertures 332 and into cavity 321. In addition, air located around the perimeter of lower insert 330 is evacuated by passing through a gap between lower insert 330 and the sides of cavity 321. A similar process forms a vacuum around the perimeter of upper insert 370.

The purpose of the vacuum is to draw sheets 212 and 214 into contact with the various portions of mold 300. This ensures that sheets 212 and 214 are properly shaped in accordance with the contours of mold 300. As discussed above, perimeter indentation 331 is primarily responsible for shaping sidewall 213 and should be configured such that sidewall 213 has sufficient height to locate peripheral bond 216 on the plane of second sheet 214. If sidewall 213 is not properly formed, peripheral bond 216 may be improperly located. Note that first sheet 212 may stretch in order to extend into perimeter indentation 331 and form sidewall 213. Differences between the original thicknesses of sheets 212 and 214, as noted above, compensate for thinning in first sheet 212 that may occur when first sheet 212 is stretched and drawn into perimeter indentation 331.

In order to provide a second means for drawing sheets 212 and 214 into contact with the various portions of mold 300, the internal area of core 220 may be pressurized to approximately 60 psi. During the preparatory stage of this method, an injection needle was located between sheets 212 and 214. Advantageously, the injection needle may be located such that channels 324 and 362 envelop the injection needle when mold 300 closes. A gas may then be ejected from the injection needle such that sheets 212 and 214 engage the surface of channels 324 and 362, thereby forming an inflation conduit between sheets 212 and 214. The gas may then pass through the inflation conduit, thereby entering and pressurizing the area of core 220. In combination with the vacuum, the internal pressure ensures that sheets 212 and 214 contact the various portions of mold 300, as depicted in FIG. 6C.

As mold 300 closes further, ridges 325 and 363 bond first sheet 212 to second sheet 214, thereby forming peripheral bond 216. Furthermore, portions of ridges 325 and 363 that bound channels 324 and 362 form a bond between sheets 212 and 214 that forms the inflation conduit noted above.

Throughout the various stages of the bonding operation, as described above, the position of lower insert 330 changes with respect to cavity 321. Initially, the upper surface of lower insert 330 extends above ridge 325, as depicted in FIG. 6A. During the portion of the bonding operation that bonds coupling layers 232 and 234 to sheets 212 and 214, respectively, lower insert 330 partially retreats into cavity 321. Accordingly, die springs 323 partially deflect and press upward, thereby placing sheets 212 and 214, core 220, and coupling layers 230 under compression, as depicted in FIG. 6B. Mold 300 then continues to close and lower insert 330 retreats fully within cavity 321, as depicted in FIG. 6C. In this position, peripheral bond 216 is formed due to the compression of sheets 212 and 214 between ridges 325 and 363. As noted above, sidewall 213 is also formed at this stage by drawing first sheet 212 into perimeter indentation 331.

Figure 7:
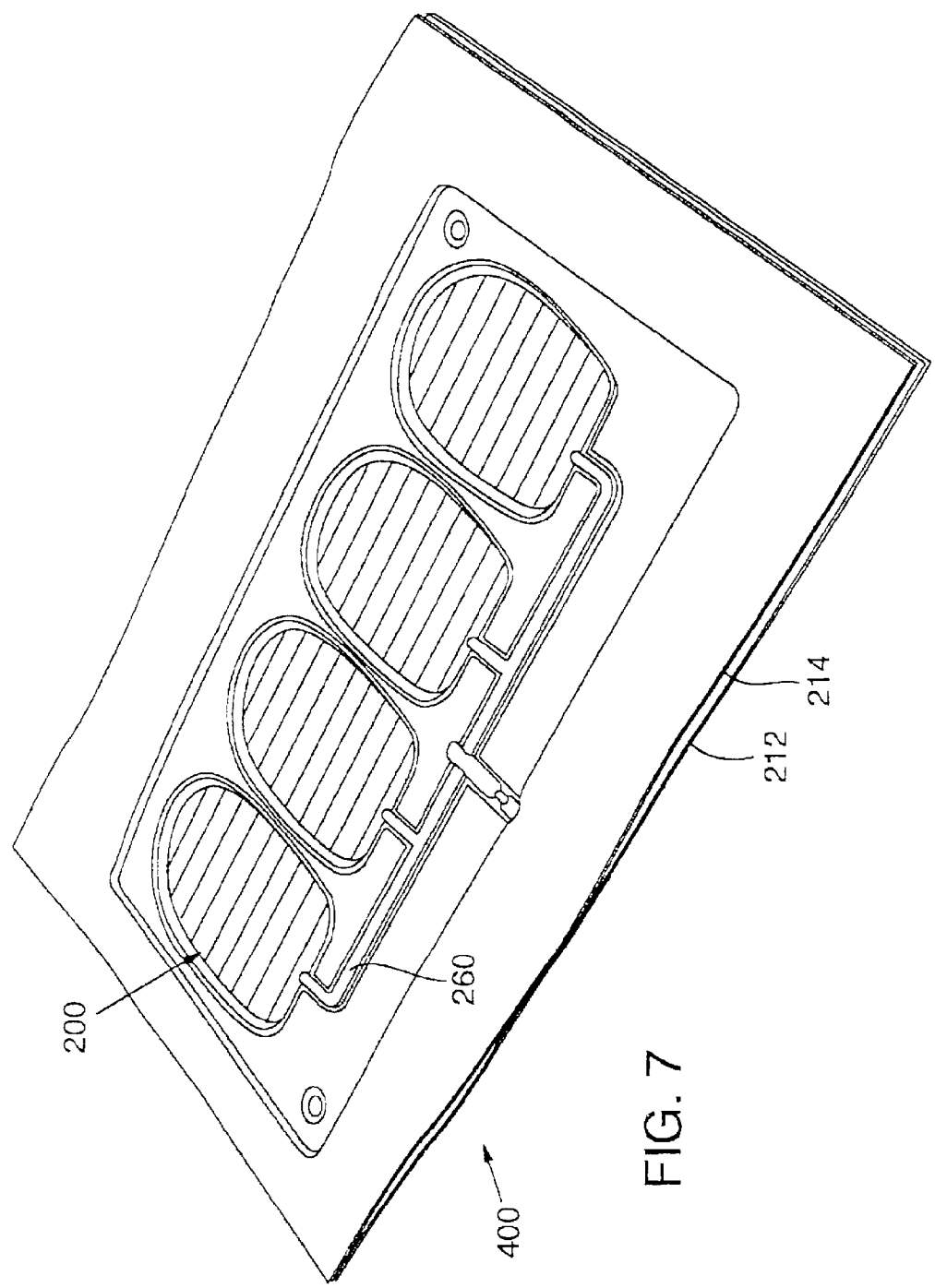
FIG. 7 is a perspective view of bonded components that include four uninflated bladders.

When bonding is complete, mold 300 is opened and a bonded component 400, as illustrated in FIG. 7, is removed and permitted to cool. Although the temperature of sheets 212 and 214 were between 300 and 320 degrees Fahrenheit following heating, cooling reduces the temperature to between 140 and 150 degrees Fahrenheit upon removal from the mold. Following further cooling, fluid 240 may be injected into the area of core 220 through the inflation needle and inflation conduit. With reference to FIG. 7, the inflation conduit is depicted as 260. Inlet 250 is then sealed through further bonding of first sheet 212 with second sheet 214. Excess portions of first sheet 212 and second sheet 214 are then removed, thereby forming bladder 200. As an alternative, the order of inflation and removal of excess material may be reversed. As a final step in the process, bladder 200 may be incorporated into the sole of an article of footwear in a conventional manner.

The present invention is disclosed above and in the accompanying drawings with reference to a variety of embodiments. The purpose served by disclosure of the embodiments, however, is to provide an example of the various aspects embodied in the invention, not to limit the scope of the invention. One skilled in the art will recognize that numerous variations and modifications may be made to the embodiments without departing from the scope of the present invention, as defined by the appended claims.

That which is claimed is:

1. A method for forming a resilient, fluid-filled bladder structure, the method comprising steps of:

placing at least one core between a first sheet and a second sheet of thermoplastic material, said at least one core having a first outer layer and a second outer layer, said outer layers being spaced apart and connected together by a plurality of connecting members;

heating said first sheet, said second sheet, and said at least one core; and bonding said first sheet to said first outer layer, bonding said second sheet to said second outer layer, and bonding said first sheet and said second sheet together around a periphery of said at least one core by compressing said first sheet, said second sheet, and said at least one core in a mold such that:

a) a first portion of said mold contacts said first sheet adjacent to said first outer layer to bond said first sheet to said first outer layer, and said first portion of said mold contacts and shapes substantially all of a sidewall area of said first sheet to form a sidewall of said bladder from said sidewall area, b) a second portion of said mold contacts said second sheet adjacent to said second outer layer, thereby bonding said second sheet to said second outer layer, and c) said first sheet and said second sheet are compressed together around the periphery of said at least one core to form a peripheral bond between said second sheet and said sidewall of said first sheet.

2. The method of claim 1, wherein the step of bonding includes forming a portion of said first sheet into a substantially planar first surface of said bladder and forming said second sheet into a substantially planar second surface of said bladder, said first surface being substantially parallel with said second surface.

3. The method of claim 2, wherein the step of bonding includes forming said peripheral bond at a location substantially coinciding with said second surface.

4. The method of claim 2, further including the step of structuring said mold to have an indentation for forming said sidewall.

5. The method of claim 4, wherein said step of structuring said mold includes configuring said indentation to form said sidewall with a height that positions said peripheral bond at a location substantially coinciding with said second surface.

6. The method of claim 1, wherein a step of inserting a pressurized fluid into a space bounded by said peripheral bond, said first sheet, and said second sheet is performed following the step of bonding to inflate said bladder and place said connecting members in an tensile configuration.

7. The method of claim 1, wherein the step of placing said at least one core between said first sheet and said second sheet includes placing an inflation needle between said first sheet and said second sheet.

8. The method of claim 7, wherein the step of bonding includes forming an inflation conduit between said first sheet and said second sheet, said inflation conduit placing said inflation needle in fluid communication with a space bounded by said peripheral bond, said first sheet, and said second sheet.

9. The method of claim 8, wherein the step of bonding includes ejecting a fluid from said inflation needle, passing said fluid through said inflation conduit and into said space, and pressurizing said space to press said first sheet against said first portion of said mold and press said second sheet against said second portion of said mold.

10. The method of claim 9, wherein the step of bonding includes forming a partial vacuum adjacent to exterior surfaces of said first sheet and said second sheet, said partial vacuum drawing said first sheet against said first portion of said mold and drawing said second sheet against said second portion of said mold.

11. The method of claim 1, wherein the step of bonding includes forming a partial vacuum adjacent to exterior surfaces of said first sheet and said second sheet, said partial vacuum drawing said first sheet against said first portion of said mold and drawing said second sheet against said second portion of said mold.

12. The method of claim 1, wherein the step of placing said at least one core between said first sheet and said second sheet includes positioning said at least one core on said first sheet such that said first portion of said mold and said second portion of said mold contact areas of said first sheet and said second sheet adjacent to said outer layers during the step of bonding.

13. The method of claim 12, wherein the step of placing said at least one core between said first sheet and said second sheet includes attaching said at least one core to said first sheet and then placing said second sheet over said at least one core.

14. The method of claim 1, wherein the step of placing said at least one core between said first sheet and said second sheet includes securing said first sheet and said second sheet to a transport mechanism that moves said first sheet and said second sheet between the steps of heating and bonding.

15. The method of claim 1, wherein prior to the step of placing said at least one core between said first sheet and said second sheet, a first coupling layer is bonded to said first outer layer and a second coupling layer is bonded to said second outer layer, said first and second coupling layers being formed of a thermoplastic material that facilitates bonding of said outer layers with said first and second sheets during the step of bonding.

16. The method of claim 1, wherein a step of incorporating said bladder structure into a sole structure of an article of footwear is performed following the step of bonding.

17. A method for forming a resilient, fluid-filled bladder structure, the method comprising steps of:
forming at least one core that includes a first outer layer and a second outer layer spaced apart and connected together by a plurality of connecting members, said first outer layer including a first coupling layer and said second outer layer including a second coupling layer, said coupling layers being formed of a thermoplastic material;
placing said at least one core between a first sheet and a second sheet that are formed of said thermoplastic material such that said first outer layer is positioned adjacent to said first sheet and said second outer layer is positioned adjacent to said second sheet;
heating said first sheet, said second sheet, and said at least one core;
bonding said first sheet to said first outer layer, bonding said second sheet to said second outer layer, and bonding said first sheet and said second sheet together around a periphery of said at least one core by compressing said first sheet, said second sheet, and said at least one core between a first portion and a second portion of a mold such that:
a) said first portion of said mold contacts said first sheet adjacent to said first outer layer, thereby bonding said first sheet to said first outer layer,
b) said first portion of said mold forms a first part of said first sheet into a substantially planar first surface of said bladder, and said first portion of said mold contacts and shapes substantially all of a second part of said first sheet to form said second part of said first sheet into a sidewall of said bladder.
c) said second portion of said mold contacts said second sheet adjacent to said second outer layer, thereby bonding said second sheet to said second outer layer,
d) said second portion of said mold forms said second sheet into a substantially planar second surface of said bladder that is substantially parallel to said first surface, and
e) said first sheet and said second sheet are compressed together around the periphery of said at least one core to form a peripheral bond between said second sheet and said second part of said first sheet, said peripheral bond being positioned at a location substantially coinciding with said second surface.

18. The method of claim 17, wherein a step of inserting a pressurized fluid into a space bounded by said peripheral bond, said first sheet, and said second sheet is performed following the step of bonding to inflate said bladder and place said connecting members in an tensile configuration.

19. The method of claim 17, wherein the step of placing said at least one core between said first sheet and said second sheet includes placing an inflation needle between said first sheet and said second sheet.

20. The method of claim 19, wherein the step of bonding includes forming an inflation conduit between said first sheet and said second sheet, said inflation conduit placing said inflation needle in fluid communication with a space bounded by said peripheral bond, said first sheet, and said second sheet.

21. The method of claim 20, wherein the step of bonding includes ejecting a fluid from said inflation needle, passing said fluid through said inflation conduit and into said space, and pressurizing said space to press said first sheet against said first portion of said mold and press said second sheet against said second portion of said mold.

22. The method of claim 21, wherein the step of bonding includes forming a partial vacuum adjacent to exterior surfaces of said first sheet and said second sheet, said partial vacuum drawing said first sheet against said first portion of said mold and drawing said second sheet against said second portion of said mold.

23. The method of claim 17, wherein the step of bonding includes forming a partial vacuum adjacent to exterior surfaces of said first sheet and said second sheet, said partial vacuum drawing said first sheet against said first portion of said mold and drawing said second sheet against said second portion of said mold.

24. The method of claim 17, further including the step of structuring said mold to have an indentation for forming said sidewall.

25. The method of claim 24, wherein said step of structuring said mold includes configuring said indentation to form said sidewall with a height that positions said peripheral bond at a location substantially coinciding with said second surface.

26. The method of claim 17, wherein the step of placing said at least one core between said first sheet and said second sheet includes positioning said at least one core on said first sheet such that said first portion of said mold and said second portion of said mold contact areas of said first sheet and said second sheet adjacent to said outer layers during the step of bonding.

27. The method of claim 26, wherein the step of placing said at least one core between said first sheet and said second sheet includes attaching said at least one core to said first sheet and then placing said second sheet over said at least one core.

28. The method of claim 17, wherein the step of placing said at least one core between said first sheet and said second sheet includes securing said first sheet and said second sheet to a transport mechanism that moves said first sheet and said second sheet between the steps of heating and bonding.

29. The method of claim 17, wherein the step of bonding includes placing a pressurized fluid in a space bounded by said peripheral bond, said first sheet, and said second sheet to press said first sheet against said first portion of said mold and press said second sheet against said second portion of said mold.

30. The method of claim 17, wherein a step of incorporating said bladder structure into a sole structure of an article of footwear is performed following the step of bonding.

31. A method for forming a resilient, fluid-filled bladder structure, the method comprising steps of:
   placing at least one core between a first sheet and a second sheet of thermoplastic material, said at least one core having a first outer layer and a second outer layer, said outer layers being spaced apart and connected together by a plurality of connecting members;
   heating said first sheet, said second sheet, and said at least one core; and
   bonding said first sheet to said first outer layer, bonding said second sheet to said second outer layer, and bonding said first sheet and said second sheet together around a periphery of said at least one core by compressing said first sheet, said second sheet, and said at least one core in a mold and inserting a pressurized fluid into a space between said first and second sheets such that:
   a) a first portion of said mold contacts said first sheet adjacent to said first outer layer and said pressurized fluid presses said first sheet against said first portion of said mold to bond said first sheet to said first outer layer, and said first portion of said mold contacts and shapes substantially all of a sidewall area of said first sheet to form a sidewall of said bladder from said sidewall area, said sidewall area being located around the periphery of said at least one core,
   b) a second portion of said mold contacts said second sheet adjacent to said second outer layer and said pressurized fluid presses said second sheet against said second portion of said mold to bond said second sheet to said second outer layer, and
   c) said first sheet and said second sheet are compressed together around the periphery of said at least one core to form a peripheral bond between said second sheet and said sidewall of said first sheet.

32. The method of claim 31, wherein the step of bonding includes forming a partial vacuum adjacent to exterior surfaces of said first sheet and said second sheet, said partial vacuum drawing said first sheet against said first portion of said mold and drawing said second sheet against said second portion of said mold.

33. The method of claim 31, further including the step of structuring said mold to have an indentation for forming said sidewall.

34. The method of claim 33, wherein said step of structuring said mold includes configuring said indentation to form said sidewall with a height that positions said peripheral bond at a location substantially coinciding with said second surface.

35. The method of claim 31, wherein a step of incorporating said bladder structure into a sole structure of an article of footwear is performed following the step of bonding.

* * * * *